Figure 1:
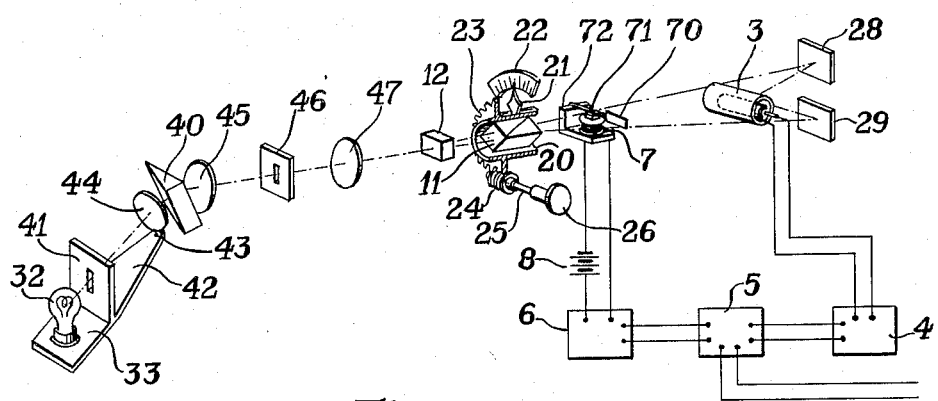

Aug. 7, 1951      A. C. HARDY      2,562,910

PHOTOMETRIC APPARATUS

Filed Jan. 20, 1950

INVENTOR.
Arthur C. Hardy
BY Eric E. Franke

Patented Aug. 7, 1951

2,562,910

UNITED STATES PATENT OFFICE 2,562,910

PHOTOMETRIC APPARATUS

Arthur C. Hardy, Wellesley, Mass., assignor to Interchemical Corporation, New York, N. Y., a corporation of Ohio Application January 20, 1950, Serial No. 139,577

8 Claims. (Cl. 250—234)

This invention pertains to a new method of comparing or measuring radiant energy, being especially useful in the art of spectrophotometry and colorimetry.

It has long been known that the most precise method of measuring the amount of light reflected by a surface is to compare the light reflected by the surface with the light reflected by a standard surface of known reflectance. This comparison can best be made by allowing the reflected beams to fall alternately on a photo-sensitive device, as described, for example, in U. S. Patent No. 1,906,198. The substitution of the one beam for the other is effected in that case by rotating a glass disk containing sectors that are alternately clear or silvered. The clear sectors allow one of the beams involved in the comparison to reach the photo-sensitive device; the silvered sectors cut off this beam while the other beam is reflected onto the photo-sensitive device. If, then, the light falling on the standard surface is reduced until, despite the alternation of the beams, no variation occurs in the response of the photo-sensitive device, the amount of the reduction is a measure of the reflectance of the surface under test. The reflectance scale can be calibrated by using another standard surface as the test surface.

An objectionagle feature of the above arrangement is a spurious signal the frequency of which is just twice the fundamental frequency. That is, if the glass disk contains two silvered sectors and two clear sectors, rotation of the disk at the rate of 30 revolutions per second should cause the photo-sensitive device to generate an electrical signal at a frequency of 60 cycles per second, assuming that the two beams are of unequal intensity. When the two beams are brought closer and closer to the point of balance, the amplitude of this 60 cycle signal should approach zero as the limit. Actually, however, the substitution of one beam for the other occurs in this case at the rate of 120 substitutions per second; and the transition, even when the two beams are of equal intensity, is found to give rise to a strong second harmonic that can easily mask the weaker fundamental.

A very large proportion of the recording spectrophotometers in use at the present time effect the alternation of the two beams in a manner set forth in U. S. Patent No. 1,987,441. In this case, the rotating sector wheel is replaced by a rotating Nicol prism. The two beams having been previously polarized in mutually perpendicular planes, rotation of the Nicol prism produces a smooth sinusoidal signal when the two beams are of unequal intensity. This device is eminently satisfactory, except for the fact that polarizing prisms are expensive, as is the auxiliary equipment.

Figure 2:
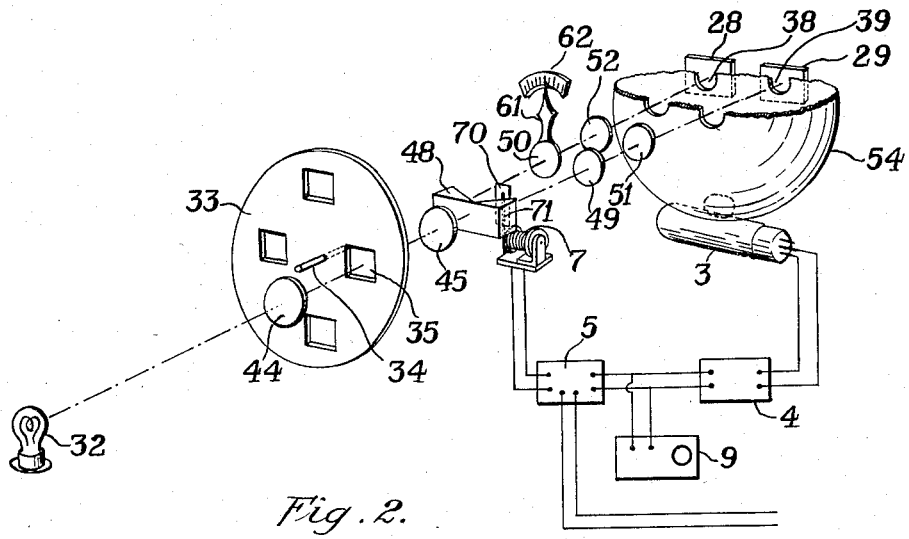

The present invention will be best understood with references to the drawing, which in Figs. 1 and 2, shows a prism dividing a beam of light into two beams, one of which illuminates a sample surface and the other a standard surface. Adjacent to this prism is a reed that can be set into vibration by electrical impulses. The motion of the reed being sinusoidal, the vane at the end of the reed causes the two beams of light to be modulated sinusoidally also.

The optical system of a spectrophotometer embodying this vibrating reed may have the general appearance of the system disclosed in Fig. 4 of U. S. Patent No. 1,987,441, except that the Wollaston prism which splits the single beam into two, may be replaced by a glass prism of small angle (sometimes called a biprism), as shown in Fig. 2 of the present drawing, and that the prism splitting light into particular wave-length components may be advantageously replaced by a suitably selected set of so-called interference filters which are characterized by transmitting very narrow bands of radiation. The reduction in intensity required to bring about a balance can be accomplished in any known manner, as, for example, by the use of polarizing elements.

If the vibrating reed is operated from a suitable external source of alternating current, a sinusoidal signal is generated in the phototube whenever the two light beams are of unequal intensity. Obviously, without using auxiliary equipment to determine the phase of the signal, it is not clear under these conditions which of the two beams is the more intense.

According to the present disclosure, the signal generated in the phototube by means of the vibrating reed is used to operate the reed. For this purpose the phototube signal is amplified and its phase so adjusted that it will maintain the reed in vibration. Even if the reed is originally at rest, it will start to vibrate spontaneously if the gain in the amplifier is sufficiently high.

Now, with the reed vibrating in this manner, let the amount of light in the more intense of the two beams be gradually reduced. As soon as the point of balance has been passed, there is a 180° change of phase in the signal generated by the photo-sensitive device. Hence, the amplified signal that previously maintained the reed in vibration is now of the proper phase to suppress the vibration.

A magic eye or some equally simple device can be used to indicate whether the reed is in vibration. The result is an exceedingly sensitive photometer since, by using sufficient gain, the reed will start to vibrate when the intensity of one beam exceeds that of the other by a small fraction of one per cent. In the other direction, the vibrations cease at the point of balance. A photometric setting can therefore be made with high precision.

It should be noted that, when the signal generated by the photo-sensitive device is used, after amplification, to operate the reed, the frequency will be the natural frequency of the reed. Preferably the natural frequency of the reed is selected so as to be different from the frequency of other ambient electrical signals. That is, if the laboratory or shop in which this device is used has alternating current supplied at 60 cycles per second, it would be well to avoid this frequency (and its harmonics) when selecting the reed. In this way, the amount of shielding is materially reduced and the light source can be more simply arranged to operate from the A. C. supply. No oiling of this device is required, nor are there any of the difficulties associated with motor-driven devices. Since the reed is not in vibration at the point of balance, there is no danger that a microphonic signal will be mistaken for a true signal due to unbalance of the light beams. While motor-driven devices or instruments having a reed operated by an outside power supply as a rule produce spurious microphonic signals, the effect of which is to displace or to mask the true point of balance, if the proper precautions are taken in feeding the phototube signals back to the reed and in oscillating the reed in this manner, microphonic disturbances can be entirely avoided.

Referring in detail to the accompanying drawing, Fig. 1 depicts a basic embodiment of my invention. For selectively employing any desired part of the spectrum, a light source 32 and slit plate 41 are mounted on a base plate 33, the arm 42 of which has a pivotal center 43 so as to permit changes of the position of the light source and the slit relative to a prism 40. The lenses 44 and 45 are placed on either side of the prism 40 in order to collimate the light through the prism and to form an image of the entrance slit 41 at the exit slit 46 of the monochromator. The lens 47 is another part of the herein employed optical arrangement, followed by a Wollaston prism 12 to divide the beam of light into two beams, plane polarized at right angles to each other. The two beams strike the light reflecting surfaces 28 and 29, respectively, one of the surfaces representing a standard and the other a sample. The phototube 3 is so positioned that it will receive light reflected from the standard and from the sample.

Inserted intermediate the two portions of the split beam, at a point as shown on the drawing, is the vane 70 which is mounted on a vibrating reed 71, preferably consisting of a thin blade of spring steel. The position of the reed depends upon the orientation of the prism 12 which determines the orbits of the two beams relative to each other. The reed is fastened to a proportionally large mass 72 at one end and the vane is adjusted in size and location in such a manner that equal portions of the two beams are obstructed when the vane is at rest, and equal alternate portions when the vane is vibrating.

The optical system comprises, furthermore, a Nicol prism 11, which is inserted in the path of the split beams and is arranged for manual angular adjustment by means of a rotatably mounted sleeve 20 and the worm wheel flange 23. The latter meshes with the worm gear 24, attached to the adjusting shaft 25 which carries the knob 26. The sleeve 20 is provided with a pointer 21, arranged to cooperate with the scale 22, in such a manner that, if the principal plane of the prism 11 is turned at an angle of 45 with that of prism 12, the scale and the pointer indicate that the combined light intensity of the two beams is equally divided between them. By changing the angle of the prism 11, the amount of light reaching the phototube from one beam is reduced while the amount of light reaching the phototube from the other beam is increased. The scale 22 is preferably calibrated to read the intensity of one beam directly in per cent of intensity of the other beam.

Upon vibration of the reed a sinusoidal signal is generated in the phototube if the two light beams are made unequal in intensity, or if a standard and a sample are used which differ in reflectance. This signal, after passing a voltage amplifier 4, a power amplifier 5 with phase control network, and a clipping circuit 6, is fed to the coil of an electromagnet 7, situated in such proximity to the reed that the latter vibrates at maximum efficiency if intermittently attracted by the iron core of the electromagnet, provided the signal is in the right phase. Changes of the polarity in the iron core of the electromagnet are prevented by inserting a D. C. source 8 in the circuit.

According to the modification illustrated in Fig. 2, light of an extremely narrow wave-length band is used instead of monochromatic light. Such narrow wave-length band radiation is obtained by means of so-called interference filters. These interference filters consist of glass plates having composite coatings of, say, a conductor and a dielectric material, the film thicknesses of which are carefully controlled. In order to obtain transmittance of a given, narrow wave-length band of radiation, the film thicknesses are made an integral number of the half-wave length of the desired radiation. While light of this particular wave-length is transmitted, the filter does not transmit radiation in the visible region of the spectrum that differs in wave-length substantially from the desired monochromatic light.

For the herein disclosed purpose, continuous light from a source 32 is passed between a conventional optical arrangement comprising the lenses 44 and 45, to focus the light onto the rear wall of an integrating sphere. These lenses are placed on either side of an interference filter 35. In order to readily avail myself of a number of interference filters transmitting narrow wave-length bands of radiation at different regions of the spectrum, I find it practical to mount these interference filters in suitable apertures of a vertical disk 33, which can be turned around the axis 34.

Inserted in the path of light passing from the lens 45 is a biprism 48 to split the beam into two beams and placed intermediate the two beams, is the vane 70, mounted on the vibrating reed 71. The split beams are then plane polarized, according to the present embodiment by means of polarizing elements 49 and 50, consisting of Polaroid sheets between glass plates. Similar analyzing elements 51 and 52 are provided for the two sections of the split beam. One of the polarizing elements, say, the polarizer 49, is positioned to permit angular adjustments with respect to the analyzer 51 in order to attain maximum transmission of light, whereas the polarizer 50 is rotatably mounted and provided with a pointer 61, arranged to cooperate with the protractor scale 62 in such a way that the maximum amount of light is transmitted by the analyzer 52 with the pointer turned to the 100 per cent position on the protractor scale.

For spectrophotometric tests of a light-reflecting material, for instance, a standard 28 and a sample 29 of the substance to be tested are placed in ports 38 and 39, respectively, provided at the rear wall of the integrating sphere 54. Light striking the standard and the sample is reflected to the wall of the sphere and from there to the phototube 3 placed next to another port of the integrating sphere.

The signals generated in the phototube may be amplified and used to drive the reed in the manner exemplified in Fig. 1. However, instead of preventing changes in the polarity of the iron core of the electromagnet by means of inserting a D. C. source into the circuit, reversal of the magnetic field is prevented according to this embodiment by augmenting the iron core of the electromagnet 7 with a suitably selected permanent magnet. Or, the reed can be driven by inserting the electromagnet 7 in the plate circuit of a so-called "D. C. controlled thyratron," represented in this instance in the drawing jointly with the power amplifier 5, and consisting of a gas-filled triode across which is shunted a combination of inductance and capacitance, the inductance being the coil of the electromagnet. The pulsating output of this circuit being unidirectional, no D. C. source is required.

Since, according to this particular embodiment, the intensity of the beam directed at port 38 of the integrating sphere is changeable, I find it most practical to adjust the phase in such a manner that vibration of the reed occurs if light reflected from material placed in port 38 exceeds the intensity of light reflected from material placed in port 39 and the vibration of the reed is suppressed if the materials are reversed.

In order to observe whether or not a sinusoidal signal of the proper phase to support vibration of the reed is generated in the phototube and to detect minute vibrations of the reed when close to the point of balance, the amplified output of the photoube is preferably caused to also operate an oscilloscope 9, or other means for detecting unbalance.

The vibrating reed operated by means of feedback signals in the foregoing manner is useful in connection with other optical instruments, such as a colorimeter or densitometer into which the afore-described instrument is readily converted by changing the spectral distribution of light passing the reed.

I claim:

1. In a photometric apparatus comprising means for generating two adjacent light beams, means for attenuating one of the said beams, a phototube arranged to receive combined light from the said beams, and means for amplifying signals generated in the said phototube, the improvement consisting of a reed adapted to vibrate by electrical impulses, a vane mounted on the reed obstructing substantially equal portions of said light beams when the reed is at rest and substantially equal alternate portions when vibrating, and means responsive to the amplified signals from the phototube to vibrate the reed in phase with the signal components derived from the more intense beam.

2. In a photometric apparatus comprising means for generating two adjacent light beams, one of the said light beams being directed at a standard and the other at a sample, means for attenuating one of the said beams, a phototube arranged to receive combined light from the standard and the sample, and means for amplifying signals generated in the said phototube, the improvement consisting of a reed adapted to vibrate by electrical impulses, a vane mounted on the reed obstructing substantially equal portions of said light beams when the reed is at rest and substantially equal alternate portions when vibrating, and means responsive to the amplified signals from the phototube to vibrate the reed when the intensity of the light received by the phototube from the standard exceeds the intensity of the light received from the samples.

3. In a photometric apparatus according to claim 2, an oscilloscope operated by the amplified phototube signals.

4. In a photometric apparatus comprising an integrating sphere having a first and second port for the insertion of samples, a phototube adjacent to another port in the integrating sphere, means for generating a light beam, a biprism dividing the said beam into two beams directed at the said sample ports in the integrating sphere, means for measurably attenuating the beam directed at the first sample port, and means for amplifying signals generated in the said phototube, the improvement consisting of a reed adapted to vibrate by electrical impulses, a vane mounted on the reed obstructing a center portion of the unsplit beam when the reed is at rest and alternate parts of a center portion of the said beam when vibrating, and means responsive to the amplified signals from the phototube to vibrate the reed when the intensity of the light received by the phototube from a sample inserted in the first port of the integrating sphere exceeds the intensity of the light received by the phototube from a sample inserted in the second port.

5. In combination, a light source, an optical system to split a beam of light from said source into two beams and to attenuate one of the two beams, a phototube arranged to receive light from the two beams, a reed adapted to vibrate by electrical impulses, attached to said reed a vane centered in the path of said beams and partly obstructing them, an electromagnet adjacent to said reed, means for amplifying signals generated in said phototube, and input means for applying a selected phase of said amplified signals to the said electromagnet.

6. In combination, a light source, an optical system to split a beam of light from said source into two beams and to attenuate one of the two beams, a phototube arranged to receive light from the two beams, a reed adapted to vibrate by electrical impulses, attached to said reed a vane centered in the path of said beams and partly obstructing them, an electromagnet adjacent to said reed, means for amplifying signals generated in said phototube, and an input circuit, including a source of unidirectional current inserted in series in the input circuit, for applying a selected phase of said amplified signals to the said electromagnet.

7. In combination, a light source, an optical system to split a beam of light from said source into two beams and to attenuate one of the two beams, a phototube arranged to receive light from the two beams, a reed adapted to vibrate by electrical impulses, attached to said reed a vane centered in the path of said beams and partly obstructing them, an electromagnet adjacent to said reed, means for amplifying signals generated in said phototube, and an input circuit, including a direct current controlled thyratron the grid of which is actuated by said amplified signals, for applying a selected phase of said amplified signals to the said electromagnet.

8. In combination, a light source, an optical system to split a beam of light from said source into two beams and to attenuate one of the two beams, a phototube arranged to receive light from the two beams, a reed adapted to vibrate by electrical impulses, attached to said reed a vane centered in the path of said beams and partly obstructing them, adjacent said reed a source providing a major unidirectional constant component of magnetic flux and a source capable of providing a minor cyclically varying component of magnetic flux, means for amplifying signals generated in said phototube, and circuit means for applying said amplified signals to the source capable of providing the minor cyclically varying component of magnetic flux.

ARTHUR C. HARDY.

REFERENCES CITED

The following references are of record in the file of this patent:

UNITED STATES PATENTS

| Number | Name | Date |
| --- | --- | --- |
| Re. 20,476 | Wilson | Aug. 17, 1937 |
| Re. 21,806 | Johnson | May 20, 1941 |
| 2,206,575 | Pineo | July 2, 1940 |
| 2,439,373 | Stearns, Jr. | Apr. 6, 1948 |
| 2,494,607 | Bouchet | Jan. 17, 1950 |